US007274157B2

(12) United States Patent
Hirata et al.

(10) Patent No.: US 7,274,157 B2
(45) Date of Patent: Sep. 25, 2007

(54) LAMP OPERATION CONTROLLER AND CONTROLLING METHOD OF LAMP OPERATION

(75) Inventors: Koji Hirata, Yokohama (JP); Ryuji Kurihara, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 11/178,449

(22) Filed: Jul. 12, 2005

(65) Prior Publication Data
US 2006/0012316 A1 Jan. 19, 2006

(30) Foreign Application Priority Data
Jul. 13, 2004 (JP) ............................. 2004-206263

(51) Int. Cl.
*H05B 37/02* (2006.01)
(52) U.S. Cl. ....................................................... 315/291
(58) Field of Classification Search ................ 315/291, 315/224, 307; 353/30, 34, 49, 85, 87
See application file for complete search history.

(56) References Cited

U.S. PATENT DOCUMENTS

| 5,608,294 | A | 3/1997 | Derra et al. | |
|---|---|---|---|---|
| 5,680,015 | A * | 10/1997 | Bernitz et al. | ............... 315/291 |
| 6,215,252 | B1 | 4/2001 | Stanton | |
| 6,232,725 | B1 | 5/2001 | Derra et al. | |
| 6,894,437 | B2 * | 5/2005 | Okamoto et al. | ........ 315/209 R |
| 6,979,960 | B2 * | 12/2005 | Okawa et al. | ............... 315/291 |
| 7,019,468 | B2 * | 3/2006 | Deurloo et al. | ............. 315/291 |
| 2002/0011803 | A1 | 1/2002 | Derra et al. | |
| 2003/0160577 | A1 * | 8/2003 | Noguchi et al. | ............ 315/291 |

FOREIGN PATENT DOCUMENTS

| JP | 2002-15883 | 1/2002 |
|---|---|---|
| JP | 2002-532866 | 10/2002 |
| JP | 2002-534766 | 10/2002 |

* cited by examiner

*Primary Examiner*—Shih-Chao Chen
*Assistant Examiner*—Minh Dieu
(74) *Attorney, Agent, or Firm*—Antonelli, Terry, Stout & Kraus, LLP.

(57) ABSTRACT

In a lamp operation controller and a method thereof, for obtaining a stable light emission, simply and certainly, without necessity of detection of a parameter accompanying discharge, the lamp operation controller, for operating a discharge lamp having a pair of electrodes, which are disposed at both ends of a light emission tube to have a predetermined distance therebetween, converts electric power of an electric power source 1, through an inverter, into alternating voltage and alternating current, changing the polarity thereof continuously and alternately, so as to produce operating current, and apply that across the pair of the electrodes of the discharge lamp, thereby letting the lamp to emit a light. A driver circuit provides a pulse at a trailing edge of the lamp current or the lamp voltage to be supplied when the discharge lamp emits the light, and also determine amplitude of the pulse, in accordance with fluctuation on the lamp voltage (VL) with respect to lighting time of the discharge lamp, which is measured in advance.

8 Claims, 8 Drawing Sheets

LAMP OPERATION CONTROLLER AND CONTROLLING METHOD OF LAMP OPERATION

BACKGROUND OF THE INVENTION

The present subject matter relates to techniques and equipment, such as, an apparatus and a method thereof for supplying operation voltage/current for use in a high-voltage discharge lamp, which can be applied into a projection-type display apparatus, for example, a liquid crystal projector, etc., and in particular, it relates to a lamp operation controller and a controlling method thereof, for obtaining a stable light (i.e., an output) irrespective of changes or variation with the passage of time in the high-pressure discharge lamp.

Conventionally, a high-pressure discharge lamp, such as, a metal-halide lamp, a high-pressure mercury lamp, etc., for example, is used, as a light source of the projection-type display apparatus, such as, the liquid crystal display projector, etc., from a reason of easily obtaining a light near to a spot-like light source, as well as, with high conversion efficiency. Also, for the purpose of lighting such the high-pressure discharge lamp, there is applied a discharge lamp lighting apparatus for exclusive use thereof, to supply voltage and current necessary for the lighting. In recent years, a method is proposed or disclosed of controlling the discharge lamp lighting apparatus with an aid of a microcomputer, thereby to keep electric power to be constant through calculation of the consumption of electric power, as is described in Japanese Patent Laying-Open No. Hei 5-74583 (1993), and Japanese Patent Laying-Open No. Hei 8-8076 (1996), for example.

The structures of the high-pressure discharge lamp are already known from, for example, Japanese Patent Laying-Open for International Application No. 2000-515311 (2000), etc. And, to the high-pressure discharge lamp are applied an alternating operation voltage and also an alternating operation current, both being in a rectangular waveform, as is already known by, Japanese Patent Laying-Open for International Application No. 2002-534766 (2002), Japanese Patent Laying-Open for International Application No. 2002-532866, Japanese Patent Laying-Open No. 2002-15883 (2002), U.S. Pat. No. 5,608,294, for example. Also, pulse-like current is supplied, for the purpose of reducing generation of fluctuation on arc voltage and/or flickers due to wear of electrodes accompanying the discharge, etc., into a specific time portion of the lamp current, having a rectangular shape or a predetermined shape changing the polarity thereof, alternately, and in particular, at the time point just before changing the polarity thereof. Thus, with an aid of additional supply of such the pulse-like current, it is possible to supply a predetermined power to the discharge lamp, and also at the same time, to suppress shifting of the position where the arc discharge occurs.

However, with the circuit apparatuses and the methods of the conventional technologies as were mentioned above, in particular, the Japanese Patent Laying-Open for International Application No. 2002-534766 (2002), the Japanese Patent Laying-Open for International Application No. 2002-532866, the Japanese Patent Laying-Open No. 2002-15883 (2002), and the U.S. Pat. No. 5,608,294, though the pulse-like current is additionally supplied onto the specific time portion of the lamp current, but at that instance, it is necessary to obtain an operation parameter of the high-pressure discharge lamp, such as, a parameter indicative of a distance between the electrodes, for example, for determining an amplitude of the pulse-like lamp current.

As an example of the parameter to be detected, for example, it is the lamp voltage between the respective ones during the continuous time period. Those can be detected by means of a microprocessor, which is provided within the circuit apparatus. In more details, it can be obtained by detecting the current flowing through an induction means of the converter.

In this manner, with the conventional technologies described in the Japanese Patent Laying-Open for International Application No. 2002-534766 (2002), the Japanese Patent Laying-Open for International Application No. 2002-532866, the Japanese Patent Laying-Open No. 2002-15883 (2002), and the U.S. Pat. No. 5,608,294, the distance between the electrodes is obtained, as being the operation parameter of the high-pressure discharge lamp, by means of the microcomputer, and the amplitude of the pulse-like lamp current is determined upon basis of the parameter obtained. For this reason, there is a further necessity of providing, such as, a current detector for detecting the current flowing through the inductance means of the converter, etc., for example. Accordingly, the number of parts of the lamp operation controller increases, or the apparatus itself becomes large in the sizes thereof, as well as, the manufacturing costs thereof.

In addition thereto, during use for a long time period of the high-pressure discharge lamp, there is a possibility that the parameter is detected erroneously, by means of the microcomputer through the current detector, due to the reason of noises generated within the lighting apparatus of the discharge lamp; i.e., the noises generated when the high voltage is produced before or after starting of lighting of the discharge lamp, etc. Further, in that instance, if the amplitude of the pulse-like lamp current is set to be a value larger than that necessary, for example, then it results into shortening of a lifetime of the high-pressure discharge lamp.

BRIEF SUMMARY OF THE INVENTION

An object is, according to the present invention, to provide a lamp operation controller and a controlling method thereof, for obtaining a stable light (i.e., an output) irrespective of changes or variation of the operation parameter(s), such as, the distance between the electrodes, during the use of the high-pressure discharge lamp for a long time-period, as well as, for enabling to reduce fluctuation in the arc voltage and/or generation of the flickers due to the waste of electrodes accompanying the discharge thereof. And also, another object of the present invention is to provide a lamp operation controller and a controlling method thereof, for enabling to reduce fluctuation in the arc voltage and/or generation of the flickers due to the waste of electrodes accompanying the discharge thereof, with ease and certainty.

According to the present invention, the lamp operation controller, for operating a discharge lamp having a pair of electrodes, being disposed to have a certain distance between the both ends thereof within a light-emitting tube, produces operation voltage or operation current, through converting electric power of an electric power source 1 into alternating voltage or alternating current, changing the polarity thereof continuously and alternately, by means of an inverter, to be applied to the pair of electrodes of the discharge lamp; thereby letting the lamp to emit a light therefrom. The driver circuit supplies a pulse at the trailing edge of the lamp voltage or the lamp current, to be supplied when the discharge lamp emits the light, under the control of using a processor circuit 17, and it determines an amplitude of the pulse, depending upon the fluctuation of the lamp voltage (VL) with respect to lighting time of the discharge lamp, which is prospected in advance.

Additional objects, advantages and novel features of the examples will be set forth in part in the description which follows, and in part will become apparent to those skilled in the art upon examination of the following and the accompanying drawings or may be learned by production or operation of the examples. The objects and advantages of the inventive concept may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like references refer to the same or similar elements.

Those and other objects, features and advantages of the present invention will become more readily apparent from the following detailed description when taken in conjunction with the accompanying drawings wherein.

DETAILED DESCRIPTION OF THE INVENTION

Figure 6:
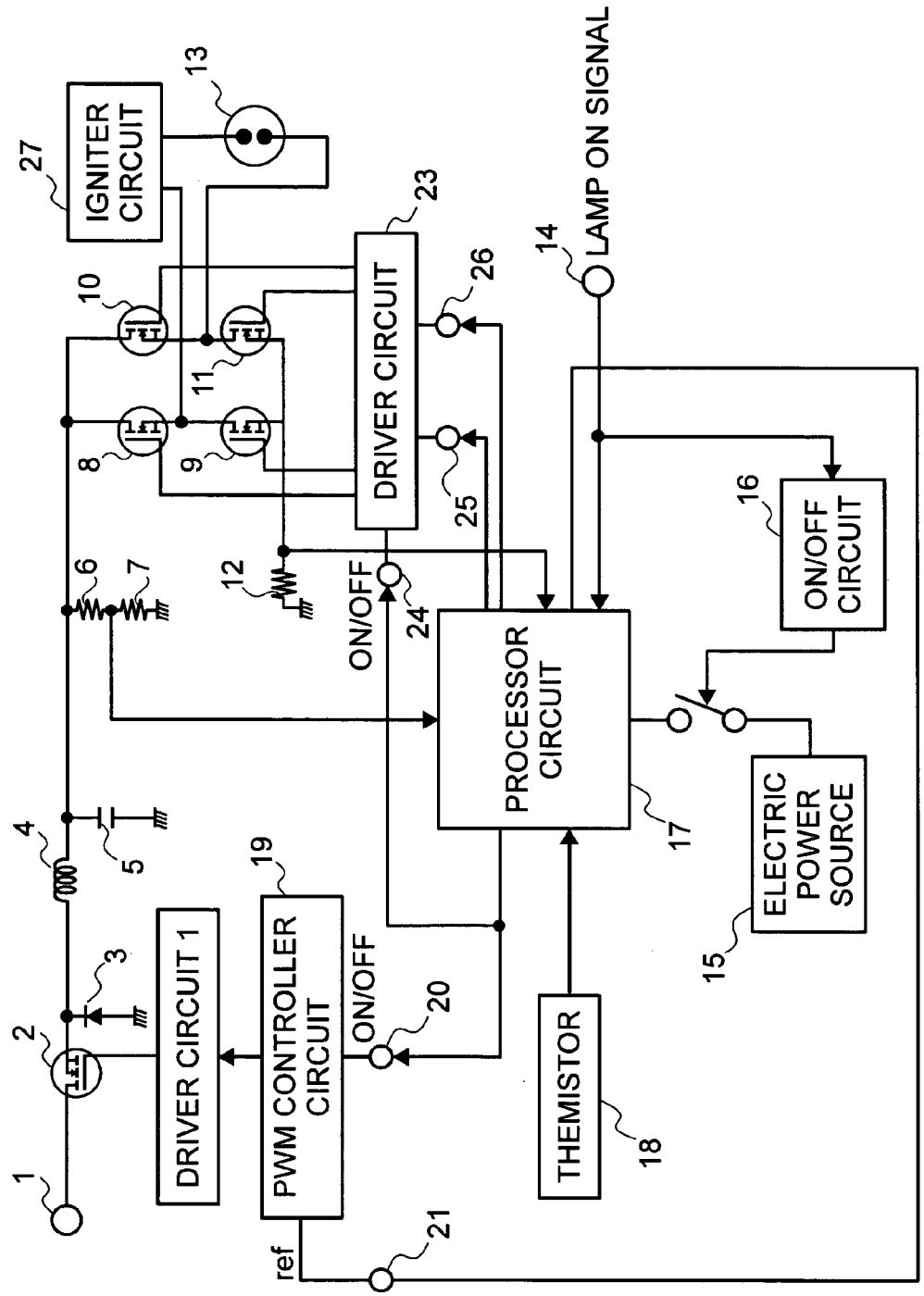
FIG. 6 is a block diagram for showing the structure of a discharge lamp lighting apparatus, being equipped with the lamp operation controller in a part thereof.

Hereinafter, embodiments according to the present invention will be fully explained by referring to the attached drawings. First of all, FIG. 6 is a block diagram for showing the structure of the discharge lamp lighting apparatus, being equipped with the lamp operation controller apparatus, according to an embodiment of the present invention, in a part thereof. Further, the discharge lamp lighting apparatus shown in this figure may be applied into; for example, the projection-type display apparatus shown in FIG. 7 attached herewith; therefore, firstly, brief explanation will be made about this projection-type display apparatus, hereinafter.

Figure 7:
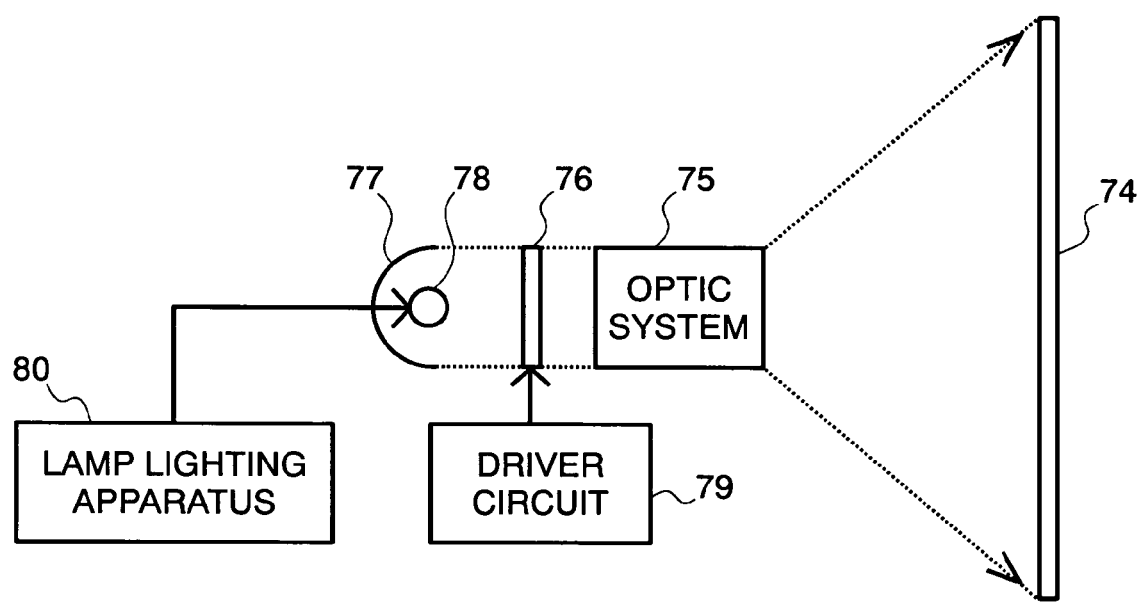
FIG. 7 is a block diagram for explaining about the structure, briefly, of a projection-type display apparatus, into which the discharge lamp lighting apparatus is applied.

In this FIG. 7, a reflector 77 and a high-pressure discharge lamp 78 build up a light source for irradiating a light from a rear surface of an image display device 76. The light penetrating through this image display device 76 is projected on a screen 74 through an optical system 75 shown in the figure (for example, a projection lens, etc.); thereby obtaining a desired projection image or picture. This image display device 76 is constructed with a liquid crystal display device (only one (1) piece of the device is shown herein, but may be a plural number of pieces thereof), for example, and an image or a picture is displayed on a light transmission surface thereof, being driven by a driver circuit 79 of the image display device mentioned above; therefore, an image can be obtained on the screen 74, being enlarged/projected onto a large screen. Further, a discharge lamp lighting apparatus 80 shown in this figure depicts an apparatus for carrying out starting and also lighting control of the high-pressure discharge lamp 78 mentioned above.

FIG. 6 is a block diagram for showing the structure of the discharge lamp lighting apparatus, being equipped with the lamp operation controller in a part thereof. In FIG. 6, a reference numeral 1 depicts an input terminal of a main electric power source, such as, a commercial electric power source, etc., for example, 2 a MOS-FET, 3 a diode, 4 a choke coil, 5 a capacitor, 6 and 7 resistors, 8, 9, 10 and 11 MOS-FETs, 12 a resistor, 13 a discharge lamp, 14 a lamp ON input terminal, 15 a power source for a processor circuit, 16 an ON/OFF circuit of the electric power for the processor circuit, 17 the processor circuit, 18 a thermistor, 19 a PWM control circuit, 20 an input terminal for an ON/OFF signal of the PWM control circuit 19, 21 an input terminal for control voltage of the PWM control circuit 19, 22 a driver circuit 1, 23 a driver circuit 2, 24 an input terminal for an ON/OFF signal of the driver circuit 23, 25 an input terminal 1 of the driver circuit 23, 26 an input terminal 2 of the driver circuit 23, and 27 an igniter circuit, respectively.

With such the structure as mentioned above, the MOS-FET 2, the a diode 3, the choke coil 4, the capacitor 5, the resistors 6, 7 and 12, the driver circuit 22 and the PWM control circuit 19 build up an electric power control circuit. The MOS-FETs 8, 9, 10 and 11, and the driver circuit 23 build up an AC (alternating current) conversion circuit. The igniter circuit 27 generates a high-voltage pulse, thereby initiating or starting the high-pressure discharge lamp 13. Also, the processor circuit 17, being constructed with a microcomputer, for example, detects an output voltage upon the voltage, which is divided by the series-connected resistors 6 and 7; i.e., detecting an output current from the voltage generated across the resistor 12. Also, by means of the thermistor 18 is achieved an observation upon temperature of the discharge lamp lighting circuit.

The processor circuit 17 produces a signal for driving the driver circuit 23 upon an input from the lamp ON input terminal 14, to be outputted to the input terminals 25 and 26 of the driver circuit 23. This processor circuit 17 also calculates out an output of electric power, upon basis of a result of detection upon the output voltage and a result of detection upon the output current, to provide the limit voltage to the input terminal for control voltage of the PWM control circuit 19, so that the output of electric power is constant; thereby achieving control thereof. Also, the detection results, such as, the output voltage, the output current, the temperature of the discharge lamp lighting circuit, etc., are compared with limit values. LV1, LV2 and LV3, which are determined within an inside of the processor circuit 17. Herein, the limit value LV1 indicates a limit value to the output voltage, the limit value LV2 a limit value to the output current, and the limit value LV3 a limit value of an overheat, i.e., the limit value to the temperature of the discharge lamp lighting circuit, respectively. Namely, the processor circuit 17 transmits a signal to the ON/OFF signal input terminal 20 of the PWM control circuit 19 and the ON/OFF signal input terminal 24 of the PWM control circuit 23, so that the discharge lamp lighting apparatus can stop the operation thereof, when a result detected upon the output voltage comes to be equal or greater than LV1, or a result of observation by the thermistor comes to be equal or greater than L3. Also, when a result of detection upon the output current comes to be equal or greater than L2, the control voltage is provided onto the ON/OFF signal input terminal 20 of the PWM control circuit 19; thereby, controlling the PWM control circuit 19 so that the output current be controlled by a current value determined by LV2.

Also, the processor circuit 17 operates upon supply of the electric power from the processor circuit power source 15. The supply of electric power of this processor circuit power source 15 is turned ON/OFF by the function of the processor circuit ON/OFF circuit 16. In more details, a timer is built in the processor circuit ON/OFF circuit 16; therefore, it stops the supply of electric power to the processor circuit, during a time-period from when starting the lighting of the discharge lamp up to when generating high voltage, after an input from the lamp ON input terminal 14.

Figure 4:
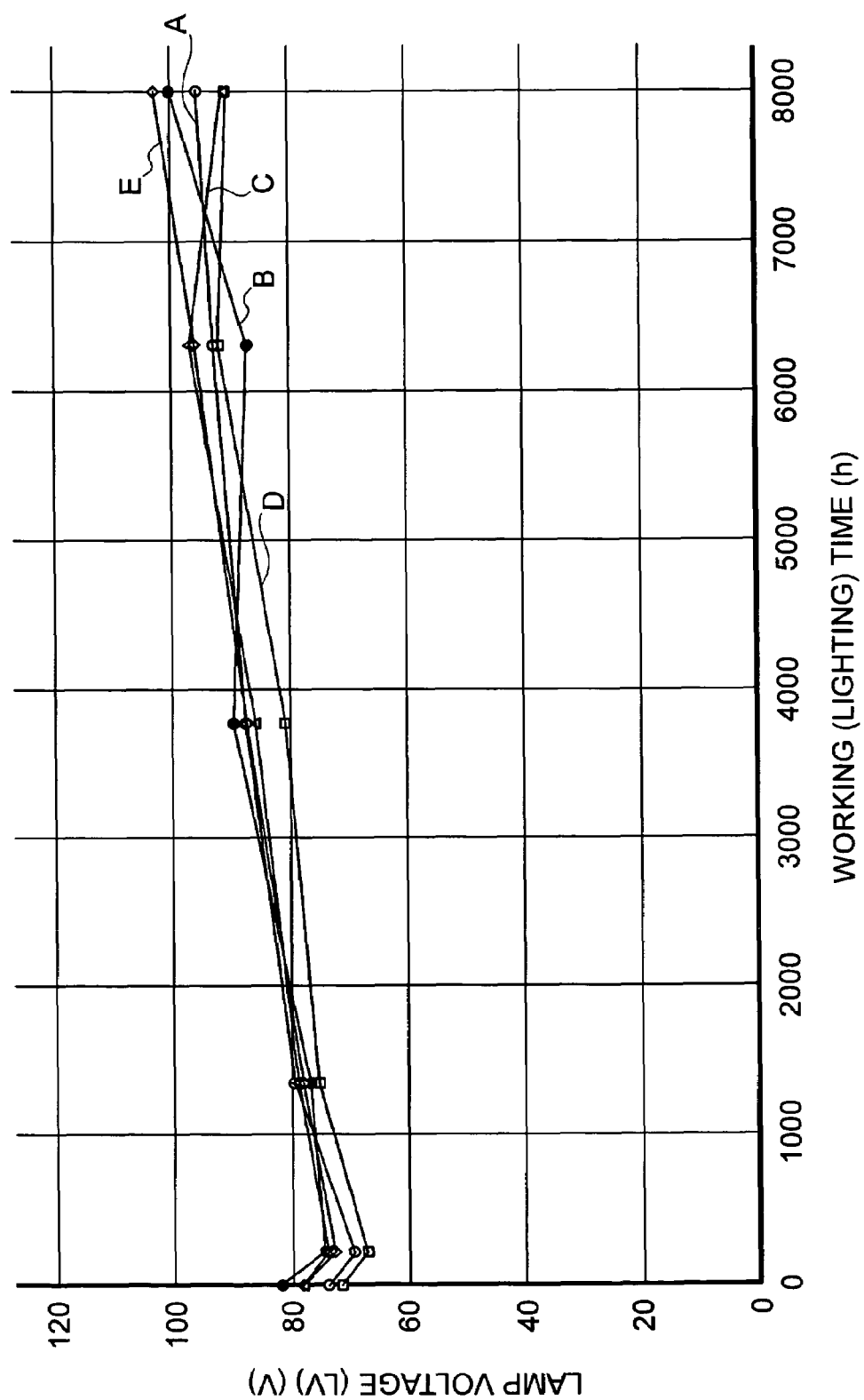
FIG. 4 is a graph for showing changes of lamp voltage (LV) with respect to a time of use (or lighting) (h), within the high-pressured is charge lamp having a rated electric power of 100 W.

Next, FIG. 4 shows characteristics with the passage of time in the discharge lamp 13 mentioned above, such as, the high-pressure discharge lamp having a rated electric power of 100 W, for example; i.e., changes of the lamp voltage (LV) with respect to the time of working (lighting) (h) in the form of a graph. Curves A to E show the characteristic curves, obtained through actual measurement of the lamp voltage LV, made on five (5) pieces of high-pressure discharge lamps, i.e., UHP 100 W made by Philips, Co., authorized to have a lifetime of 10,000 hours, on the basis of elapsing of the working (lighting) time thereof.

Figure 5:
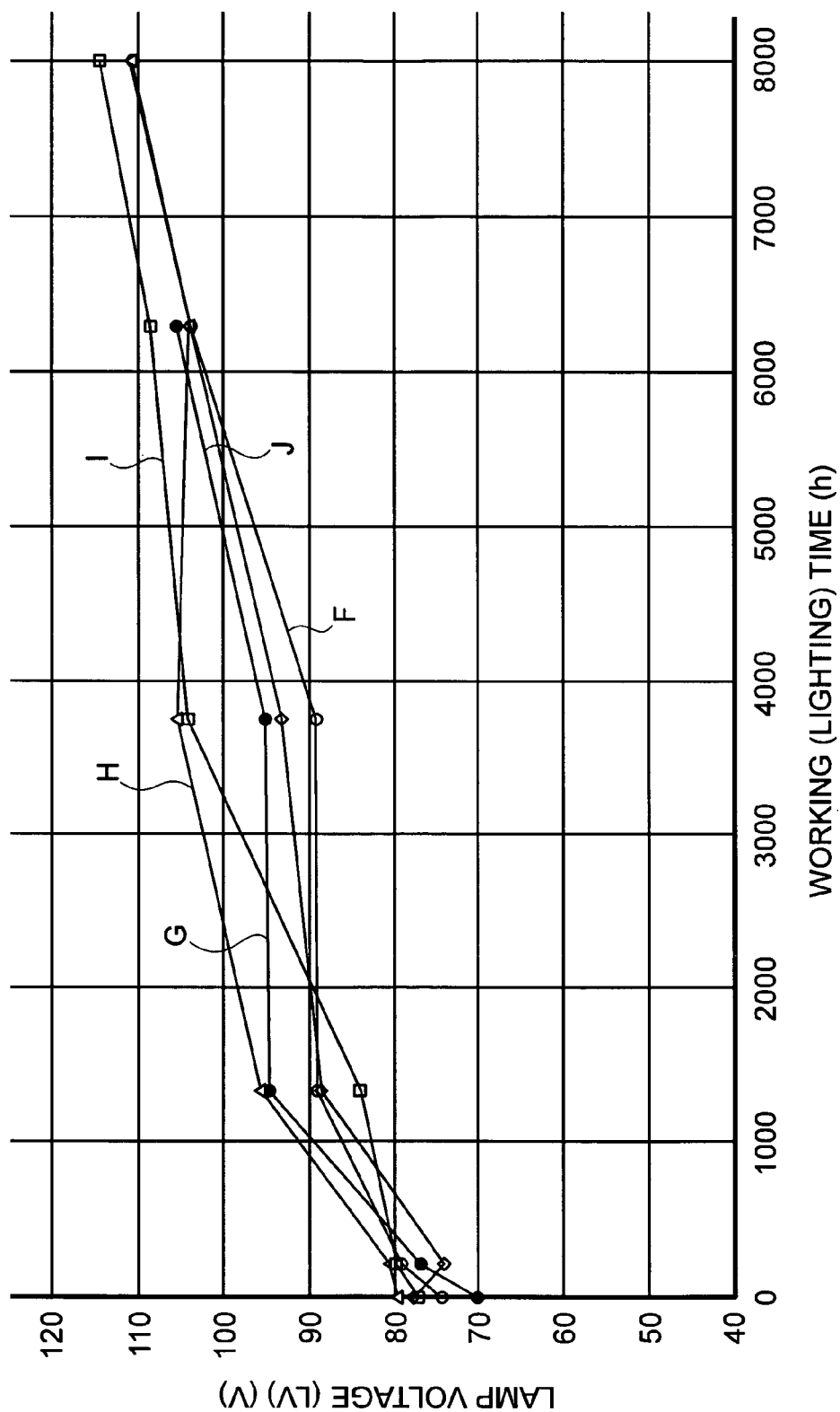
FIG. 5 is a graph for showing changes of lamp voltage (LV) with respect to a time of use (or lighting) (h), within the high-pressure discharge lamp having a rated electric power of 120 W.

Further, FIG. 5 also shows characteristics with the passage of time in the discharge lamp 13 mentioned above, in the similar manner to the above, but the high-pressure discharge lamp having a rated electric power of 120 W, for example; i.e., changes of the lamp voltage (LV) with respect to the working (lighting) time (h) in the form of a graph. Also, curves F to I in this graph show the characteristic curves, obtained through actual measurement of the lamp voltage LV, made on five (5) pieces of high-pressure discharge lamps, i.e., UHP 120 W made by Philips, Co., authorized to have a lifetime of 8,000 hours, on the basis of elapsing of the working (lighting) time thereof.

As is apparent from those FIGS. 4 and 5, on the high-pressure discharge lamp, the lamp voltage (LV) falls down or rises up, abruptly, within an initial time-period of use (i.e., from 0 to 200 hours, approximately); however, thereafter it shows a tendency of go up at a almost constant rate until reaching to the lifetime, irrespective of kinds thereof. Thus, in FIG. 4, the lamp voltage (LV) rises up at almost constant rate, nearly from 70V to 100V, and in FIG. 5, nearly from 80V to 110V. With using such the characteristic of the high-pressure discharge lamp, positively, the operating electric power within the discharge lamp lighting apparatus, i.e., the operating voltage or current is controlled by means of the lamp operation controller, which will be mentioned below. In more details, after determining it at the most suitable value, upon basis of the fluctuation of the lamp voltage (LV) to the working (lighting) time of the high-pressure discharge lamp, which can be prospected in advance, the control is carried out by referring the value of pulse-like current to be applied, which will be explained hereinafter, upon basis of the working (lighting) time of the lamp, which will be measured successively.

Figure 1:
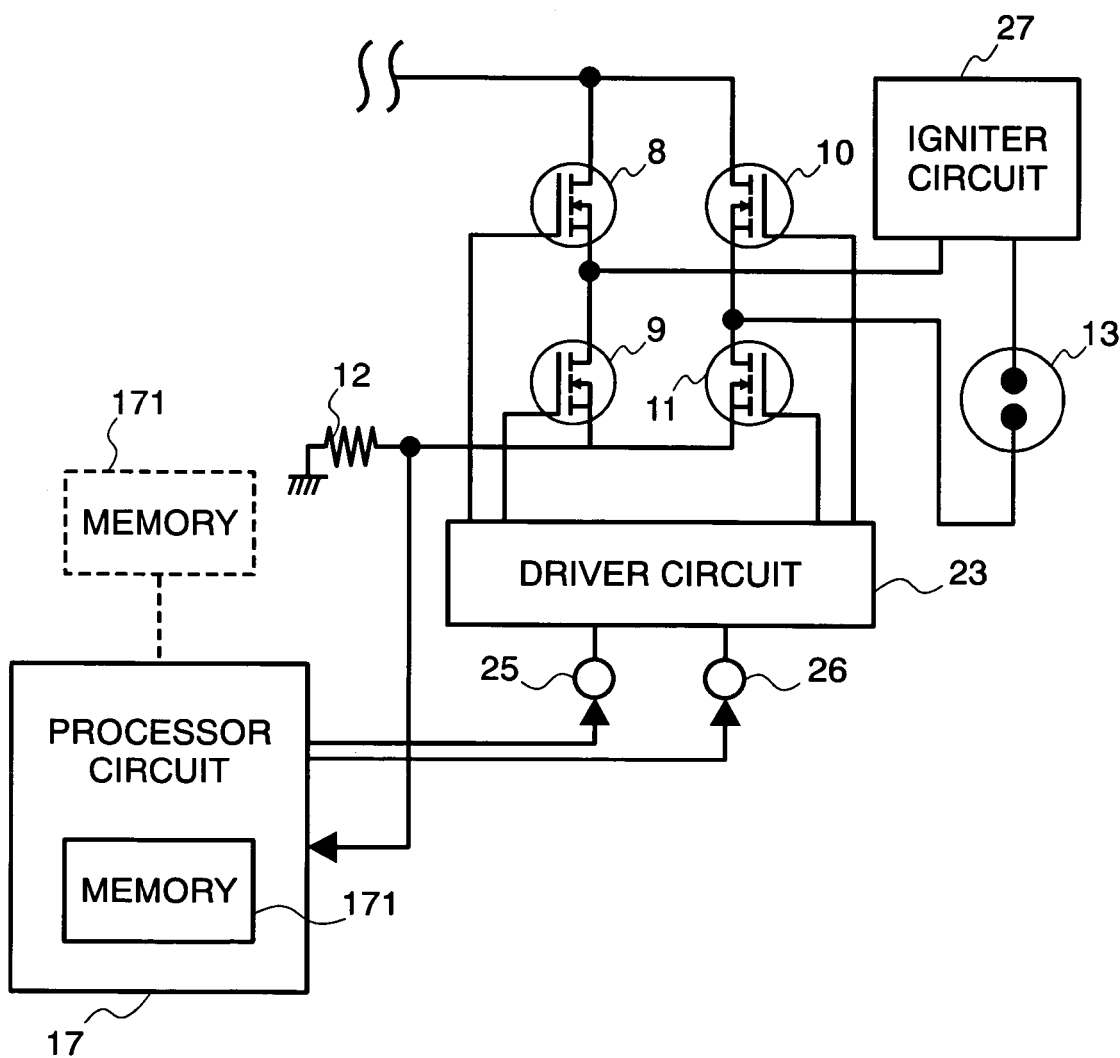
FIG. 1 is a block diagram for showing the structure of the lamp operation controller, according to an embodiment of the present invention.

Next, FIG. 1 shows only the elements of building up the lamp operation controller, picking up from the constituent elements of the discharge lamp lighting apparatus, details of which is shown in FIG. 6 mentioned above. Namely, the lamp operation controller can be constructed, easily, with the processor circuit 17, being built up with the microcomputer, for example, the driver circuit 24, and the inverter, which is constructed with four (4) pieces of the MOS-FETs 8, 9, 10 and 11, but without provision of any detector of parameters, other than those. Thus, the discharge lamp lighting apparatus of a method for controlling it with using a microcomputer therein, which is adopted conventionally, can be applied, almost as it is, and for this reason, it is advantageous from a viewpoint of manufacturing costs thereof. In this example, the processor circuit 17 further comprises a memorizing means (i.e., a memory) 171, within an inside thereof, and into this internal memory 171 is memorized data (information) in relation to the pulse-like current to be applied, which will be mentioned in more detail hereinafter. As is indicated by broken lines, this memory 171 may be built up with an external memory, which is provided within an outside of the processor circuit 17.

By the way, within the lamp operation controller shown in FIG. 1, the processor circuit 17 controls the driver circuit 23 through software, which is stored within the internal memory thereof. Thus, across the discharge lamp 13 is applied lamp-operating voltage, which is produced by the inverter constructed with four (4) pieces of the FETs 8-11, and then the lamp current, the waveform of which is shown in FIG. 2, is supplied to the discharge lamp 13.

Figure 2:
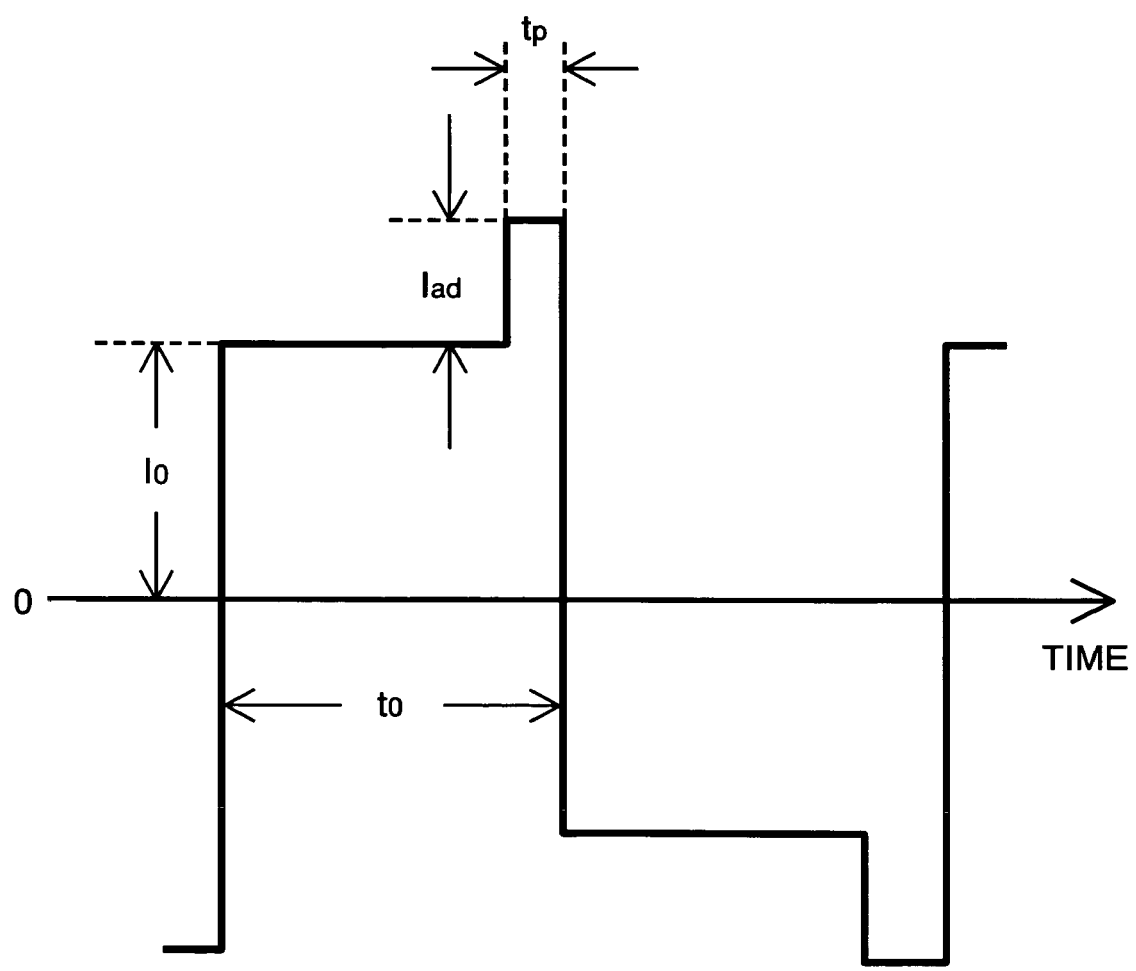
FIG. 2 is a view for showing an example of the waveform of lamp current, to be supplied to a discharge lamp by means of the lamp operation controller mentioned above.

The lamp current shown in FIG. 2 is supplied to the discharge lamp when it radiates a light, for preventing the arc voltage from being changed due to waste of the electrodes accompanying the discharge thereof, and it has such a waveform that the pulse-like current is added $(I_0+I_{ad})$ onto a specific portion of the rectangular lamp current $(I_0)$, changing the polarity thereof into the positive and the negative, continuously and alternately. The processor circuit 17 controls the lamp operating voltage so that such the waveform can be obtained. The processor circuit 17 gives instructions to the driver circuit 23, about a voltage value and/or a cycle (time width of a rectangular wave) for producing the rectangular voltage, and further a value of the pulse-like current and a cycle (width of a rectangular wave); i.e., making the inverter generate the lamp-operating voltage having such the waveform as was mentioned above.

From a viewpoint of obtaining a stable spot light source, reducing the generation of flickers, which is caused from a reason of movement or shifting on the position of generating the arc discharge, the specific portion, onto which this pulse-like current should be added, is preferably a position just before where the rectangular alternating voltage reverses the polarity thereof (i.e., a trailing edge portion). Also, the cycle or a period $(t_0)$ of the rectangular lamp current, in general, is set at, approximately, from 2.5 ms up to 8.3 ms, and more preferably, within a range from 4.0 ms to 5.2 ms. Also, the time width $(t_p)$ of the pulse-like current is set to be within a range from $t_0/50$ to $2t_0/3$, for example, with respect to the period $(t_0)$ mentioned above.

With the controlling method of executed by the lamp operation controller, an amplitude of the pulse-like current is determined with using the lamp voltage (LV) to the working (lighting) time of the discharge lamp, which is measured in advance. Namely, calculation is made on the amplitude (i.e., the current value) of the pulse-like current to be added, in advance, upon basis of charges or variation with passage of time on the operating voltage of the discharge lamp, which was obtained in advance, and this is stored into the memory 171. Then, when producing the lamp-operating voltage, the processor circuit 17 takes out the value $(I_{ad})$ of the pulse-like current to be added, which is stored in that memory 171, depending upon the working (lighting) time of the lamp at that time-point, thereby determining the operating voltage of the discharge lamp.

Following to the above, explanation will be given hereinafter, about the processing for determining information relating to the changes with passage of time of the lamp, most suitably, at each time-point of the lighting operation of the lamp, by referring to FIGS. 3a and 3b. In more detail, explanation will be made about the processing for determining the value ($I_{ad}$) of the pulse-like current to be added, most suitably, in accordance with fluctuation on the lamp voltage (LV) of the discharge lamp, which is measured in advance.

Figures 3A, 3B:
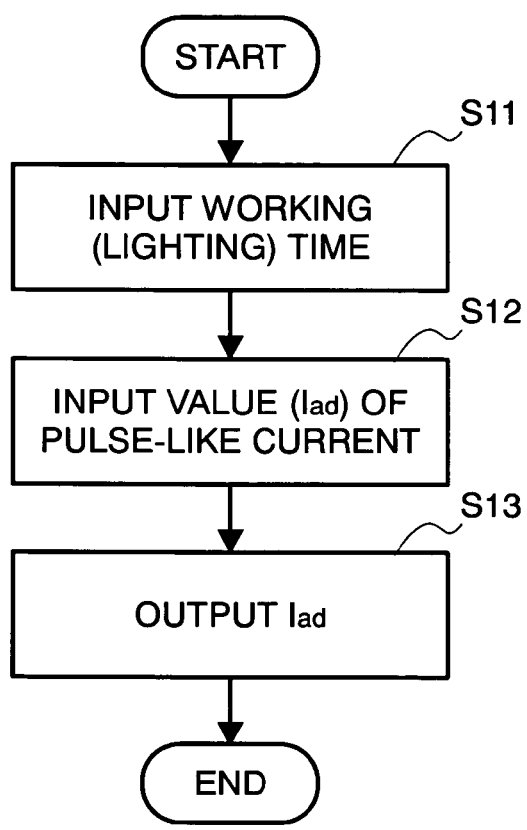
FIGS. 3A and 3B are views for explaining about the steps of processing for determining a pulse-like current to be added, appropriately, which are executed within the lamp operation controller, and the contents in a memory thereof.

The processor circuit 17 starts up program stored in the memory portion thereof, for executing the processing shown in FIG. 3a, at a timing of a unit of around from 20 hours up to 200 hours, for example. Then, the operation time of the apparatus is obtained, i.e., the working (lighting) time of the high-pressure discharge lamp 13), which is accumulated, upon basis of the internal time thereof, etc. (step S11). Next, as is shown in FIG. 3b, the values of the pulse-like current ($I_{adT1}$, $I_{adT2}$, ... $I_{adTN}$, $I_{adTN+1}$, ... ) are inputted, which are the data stored into the memory 171, with using the operation (lighting) times (T1, T2 ... Tn, Tn+1 ... ) as address values thereof (step S12). Thereafter, the current values inputted are given or indicated to the driver circuit 23 (step S 13), thereby completing the processing.

There is no necessity of detecting the parameter indicative of the distance between the electrodes, as being the operation parameter of the high-pressure discharge lamp, as was in the conventional technology mentioned above, such as, the lamp voltage during the operation time-period; therefore, it is possible to determine the value ($I_{ad}$) of the pulse-like current to be supplied to the discharge lamp additionally, appropriately at the most suitable value, easily, only by referring to the memory 171 upon basis of the operation (lighting) time of the lamp. Namely, irrespective of changes of the operation parameter, such as, the distance between electrodes during a use of the high-pressure discharge lamp for a long time, etc., for example, it is possible to obtain a stable output of the light, as well as, enabling to reduce the changes on the arc voltage and/or the generation of flickers due to waste of the electrodes accompanying the discharge, but without shortening the life-time of the high-pressure discharge lamp.

In the example explained in the above, while making calculation thereof in advance, upon basis of changes with passage of time on the operation voltage of the discharge lamp, which was obtained in advance, the amplitude (the current value) $I_{ad}$ is stored into the memory 171. However, the present embodiment should not be limited only to that, but it may be applicable therein, for example, to store the values of lamp voltage (LV) into the memory 171, i.e., being the changes with the passage of time on the operation voltage of the discharge lamp, which were obtained in advance. However, in that instance, the processor circuit 17 determines the amplitude $I_{ad}$ of the pulse-like current (i.e., current value) to be added, upon basis of the value of the lamp voltage (LV) that is read out.

Also, as was mentioned above, since the lamp voltage (LV) shows the tendency of going up at almost constant rate together with the passage of the working (lighting) time thereof, therefore it is also possible to calculate it out from the following equation (Eq. 1), for each time "t" at arbitrary, easily:

$$LV=70+(100-70)20t/80000=70+3/40t \quad \text{(Eq. 1)}$$

Herein is shown an example, in case of the high-pressure discharge lamp shown in FIG. 4, which is rated to be 100 W and also has a lifetime of 8,000 hours, for example. In case of obtaining the lamp voltage (LV), which changes with respect to the working (lighting) time thereof, in this manner, with using the predetermined equation for calculation, it is necessary to prepare an equation for calculating thereof, in advance. On the other hand, since it needs no provision of such the memory 171 mentioned above, therefore, it is preferable. Also, the equation for calculation is a simple one of linear, as was mentioned above, and therefore it is possible to determine it, easily, upon basis of the values of the lamp voltage (LV) of the discharge lamp, which were measured in advance (in particular, the value after elapsing 200 hours and the value at the maximum time (i.e., the lifetime); therefore, it is apparent that it can be achieved, easily.

Further, in the example mentioned above, as was shown in FIG. 2 mentioned above, such the control is conducted upon the waveform of the lamp current to be supplied when the discharge lamp radiates the light, that the pulse-like current is added ($I_0+I_{ad}$) at the trailing edge of the lamp current ($I_0$), which changes the polarity thereof into the positive one and the negative one, continuously and alternately. However, the present invention should not be restricted only to this, but it is also possible to apply the waveforms shown in FIGS. 8A and 8B, for example, in the place thereof.

Figure 8A:
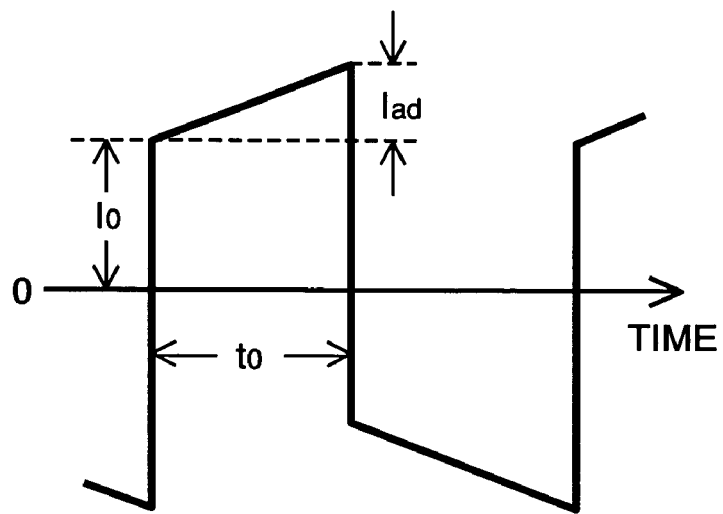
FIGS. 8A and 8B are views for showing waveforms of the lamp current, other than that shown in FIG. 2.
Figure 8B:
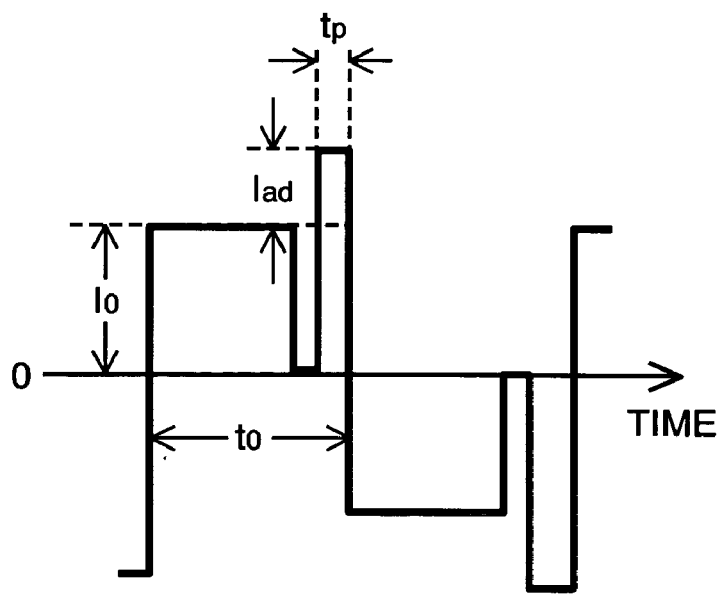

Namely, the waveform of the lamp current shown in FIG. 8A changes the current value, continuously, from ($I_0$) to ($I_0+I_{ad}$), as well as, changing the polarity thereof into the positive one and the negative one, continuously and alternately. Also, the lamp current shown in FIG. 8B has a waveform of being added with a pulse-like current, following the rectangular changing the polarity thereof into the positive one and the negative one, continuously and alternately, but independent from those. Further, the pulse-like current, being added independently, has the current value of ($I_0+I_{ad}$). However, also in this case, it is possible to determined that value $I_{ad}$, most suitably, upon changes with the passage of time on the operating voltage of the discharge lamp, in the similar manner to the embodiment mentioned above.

Also, with those waveforms of the lamp current, there is no necessity, too, of detecting the parameter indicative of the distance between electrodes, such as, the lamp voltage during the operating period thereof, etc., for example, as the operating parameter for the high-pressure discharge lamp, and further it is also possible to reduce the changes on the arc voltage and the generation of flickers due to waste of the electrodes accompanying the discharge therebetween, as well as, obtaining a stable output of light, irrespective of changes on the operating parameter, such as, the distance between electrodes during the use of the high-pressure discharge lamp for a long time-period. Furthermore, it is also apparent, there can be obtained an effect that those do not shorten the lifetime of the high-pressure discharge lamp.

As was mentioned above, according to the present invention, there is provided a lamp operation controller for operating the discharge lamp having a pair of electrodes, being disposed at both ends of a light emission tube to have a distance of a specific length therebetween, comprising: an electric power source; means for converting electric power of said electric power source into alternating voltage changing polarity thereof into a positive one and a negative one, continuously and alternately, to produce operating voltage; and a controller means for controlling production of the operating voltage by means of said means, thereby applying said produced operating voltage across the pair of the electrodes thereof, so as to let said discharge lamp to radiate a light, wherein said controller means provides a pulse to a portion on lamp current to be supplied when said discharge lamp radiates the light, and also determines an amplitude of said pulse, in accordance with fluctuation on the operating voltage of said discharge lamp with respect to a lightning time thereof, which is prospected in advance.

Also, according to the present invention, there is also provided a lamp operation controlling method for operating the discharge lamp having a pair of electrodes, being disposed at both ends of a light emission tube to have a distance of a specific length therebetween, comprising the flowing steps of: producing operating voltage through converting electric power of an electric power source into alternating voltage, changing polarity thereof into a positive one and a negative one, continuously and alternately; applying said produced operating voltage to the pair of the electrodes of said discharge lamp, thereby letting said discharge lamp to radiate a light, wherein a pulse is provided to a portion on lamp current to be supplied when said discharge lamp radiates the light, and also an amplitude of said pulse is determined, in accordance with fluctuation on the operating voltage of said discharge lamp with respect to a lightning time thereof, which is prospected in advance.

Further, in the lamp operation controller and the method thereof mentioned above, said determining means comprises a memory, and said memory making up said determining means, preferably memorizes the current value of said pulse, which is determined in advance, depending upon the lighting time of said discharge lamp, or a fluctuation value on the operating voltage of said discharge lamp, depending upon the lighting time of said discharge lamp. Or, alternately, said determining means may determine the value of said pulse, in accordance with an equation, which is determined upon the fluctuation on the operating voltage of said discharge lamp with respect to the lighting time thereof, which is measured in advance.

As was fully mentioned above, the present invention is accomplished by paying an attention onto the fact that the voltage of the high-pressure discharge lamp shows a tendency of rising up at almost constant rate, until when it reaches to the lifetime thereof. Thus, with the above-mentioned lamp operation controller and the method thereof, using that fact therein, being obtainable, simply and certainly, but without necessity of detection of the parameter, such as, the current detector, etc., as is in the conventional art, further it is also possible to obtain a superior effect that a stable output of light can be obtained, irrespective of changes on the operating parameter, such as, the distance between the electrodes under use of the high-pressure discharge lamp for a long time-period, as well as, enabling to reduce changes on the arc voltage and/or generation of the flickers, due to waste of electrodes accompanying the discharge therebetween.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A lamp operation controller, comprising:
an electric power source;
an inverter for converting electric power of said electric power source into alternating voltage, changing polarity thereof into a positive polarity and a negative polarity, alternately, thereby producing operating current;
a discharge lamp having a pair of electrodes, which are disposed at both ends of a light radiation tube to have a specific distance therebetween, for radiating a light upon application of the produced operating current between the pair of electrodes of said discharge lamp; and
a processor circuit for controlling production of said operating current by means of said inverter, wherein said processor circuit supplies a pulse to a portion on lamp current, which is supplied when said discharge lamp radiates the light, and also determines an amplitude of said pulse, depending upon fluctuation on operating voltage of said discharge lamp with respect to a lightning time thereof, which is prospected in advance.

2. The lamp operation controller, as described in the claim 1, wherein said processor circuit comprises a memory.

3. The lamp operation controller, as described in the claim 2, wherein said memory stores a current value of the pulse, which is determined in advance, depending upon the lighting time of said discharge lamp.

4. The lamp operation controller, as described in the claim 2, wherein said memory memorizes a fluctuating value on the operating voltage of said discharge lamp, depending upon the lighting time of said discharge lamp.

5. The lamp operation controller, as described in the claim 1, wherein said processor circuit determines a value of the pulse in accordance with an equation, which is set upon basis of the fluctuation of the operating voltage of said discharge lamp with respect to the lightning time of said discharge lamp, which is prospected in advance.

6. A lamp operation controlling method, for operating a discharge lamp having a pair of electrodes, which are disposed at both ends of a light radiating tube at a specific distance therebetween, comprising the following steps of:
producing operating current through converting electric power of an electric power source into alternating current, changing polarity thereof into a positive one and a negative one, continuously;
determining an amplitude of a pulse of lamp current to be supplied, in accordance with fluctuation of driving current of said discharge lamp with respect to a lighting time of said discharge lamp, which is prospected in advance;
supplying the pulse of the amplitude determined to a specific portion on the lamp current; and
supplying the operating current produced to a pair of electrodes of said discharge lamp, thereby radiating a light therefrom.

7. The lamp operation controlling method, as described in the claim 6, wherein current value of said pulse is read out, depending upon the lighting time of said discharge lamp, from said memory storing the current value of said pulse, which is determined in advance, depending upon the lighting time of said discharge lamp, and thereby determining the amplitude of said pulse.

8. The lamp operation controlling method, as described in the claim 6, wherein the value of said pulse is determined in accordance with an equation, which is set upon basis of the fluctuation on operating voltage of said discharge lamp with respect to the lighting time of said discharge lamp, which is prospected in advance.

* * * * *